(12) United States Patent
Kawano et al.

(10) Patent No.: US 9,800,149 B2
(45) Date of Patent: Oct. 24, 2017

(54) SWITCHING REGULATOR

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 15/458,475

(22) Filed: Mar. 14, 2017

(65) Prior Publication Data

US 2017/0271986 A1    Sep. 21, 2017

(30) Foreign Application Priority Data

Mar. 15, 2016  (JP) ................. 2016-051496

(51) Int. Cl.
*H02M 3/157* (2006.01)
*H02M 1/08* (2006.01)
*H02M 3/158* (2006.01)
*H02M 1/00* (2006.01)

(52) U.S. Cl.
CPC ............ *H02M 3/157* (2013.01); *H02M 1/08* (2013.01); *H02M 3/1588* (2013.01); *H02M 2001/0012* (2013.01)

(58) Field of Classification Search
CPC .... H02M 3/157; H02M 3/156; H02M 3/1563; H02M 1/08

USPC ................................................. 323/283, 284
See application file for complete search history.

(56) References Cited

U.S. PATENT DOCUMENTS

| | | | | |
|---|---|---|---|---|
| 9,479,054 B2* | 10/2016 | Shiina | ................. | H02M 3/1563 |
| 9,608,521 B2* | 3/2017 | Shiina | ................... | H02M 3/156 |
| 2008/0218133 A1* | 9/2008 | Kuan | .................... | H02M 3/156 |
| | | | | 323/234 |
| 2012/0019218 A1* | 1/2012 | Fang | ..................... | H02M 3/156 |
| | | | | 323/271 |
| 2013/0063102 A1* | 3/2013 | Chen | ..................... | H02M 3/156 |
| | | | | 323/234 |
| 2014/0191744 A1* | 7/2014 | Choi | ..................... | H02M 3/156 |
| | | | | 323/283 |
| 2015/0263616 A1 | 9/2015 | Shina et al. | | |
| 2015/0280557 A1* | 10/2015 | Xue | ....................... | H02M 3/157 |
| | | | | 323/271 |
| 2016/0105111 A1* | 4/2016 | Yang | ................... | H02M 3/1563 |
| | | | | 323/271 |
| 2017/0126128 A1* | 5/2017 | Li | ........................... | H02M 1/08 |

* cited by examiner

*Primary Examiner* — Kyle J Moody
(74) *Attorney, Agent, or Firm* — Brinks Gilson & Lione

(57) ABSTRACT

To provide a switching regulator equipped with an on-time control circuit small in power consumption. An on-time control circuit is configured to be equipped with switches each turned on/off by a signal controlling on and off of a switching element and be turned off during an off-time of the switching element.

2 Claims, 4 Drawing Sheets

300

SWITCHING REGULATOR

RELATED APPLICATIONS

This application claims priority under 35 U.S.C. §119 to Japanese Patent Application No. 2016-051496 filed on Mar. 15, 2016, the entire content of which is hereby incorporated by reference.

BACKGROUND OF THE INVENTION

Field of the Invention
The present invention relates to a switching regulator.
Background Art
COT (Constant On Time) control has been known as one of control methods of a switching regulator.
FIG. 3 is a circuit diagram of a related art COT-controlled switching regulator.
The switching regulator 300 causes an R-S flip-flop 13 to output a signal controlling a switching element in accordance with a signal outputted from an error comparator 10 which compares a feedback voltage VFB based on an output voltage VOUT and a reference voltage VREF, and a signal outputted from an on-time control circuit 31. The on-time control circuit 31 is a circuit essential in the COT control.
FIG. 4 is a circuit diagram of a related art on-time control circuit.
The on-time control circuit 31 charges a capacitor 32 with a current proportional to an input power supply voltage VIN, which is made to flow by a current source 33 and causes a comparator 35 driven by a current made to flow by a current source 34 to compare the voltage of the capacitor 32 with the output voltage VOUT to determine an on-time. Thus, the on-time control circuit 31 determines an on-time inversely proportional to the input power supply voltage VIN and proportional to the output voltage VOUT (refer to, for example, Patent Document 1).
[Patent Document 1] Japanese Patent Application Laid-Open No. 2015-188300
However, a reduction in power consumption of an analog circuit block in addition to a reduction in the on resistance of a switching element has been an urgent need for the recent battery-driven portable device and wearable device for which lower power consumption and an improvement in efficiency are required.

SUMMARY OF THE INVENTION

The present invention has been made in view of the above need and aims to provide a switching regulator equipped with an on-time control circuit small in power consumption.
In order to solve the above problems, the switching regulator equipped with the on-time control circuit of the present invention is configured as follows.
The present switching regulator is a switching regulator outputting a desired output voltage to an output terminal by a switching element from a power supply voltage, which is equipped with an error comparator which monitors the output voltage to output a set signal, an on-time control circuit which outputs a reset signal controlling an on-time of the switching element, an R-S flip-flop which outputs an on signal determining a period of turning on the switching element, based on the set signal and the reset signal, and an output control circuit which outputs a control signal to the switching element, based on the on signal of the R-S flip-flop, and in which the on-time control circuit is equipped with a first input terminal inputted with the on signal outputted from the R-S flip-flop, and a second input terminal inputted with the control signal outputted from the output control circuit and performs an intermittent operation, based on the control signal inputted to the second input terminal.
According to a switching regulator equipped with an on-time control circuit of the present invention, there is an effect that since an on-time control circuit is configured to be turned off during an off-time of a switching element, power consumption can be reduced. An effect of reducing power consumption becomes large particularly at a light load.

DETAILED DESCRIPTION OF THE PREFERRED EMBODIMENTS

Figure 1:
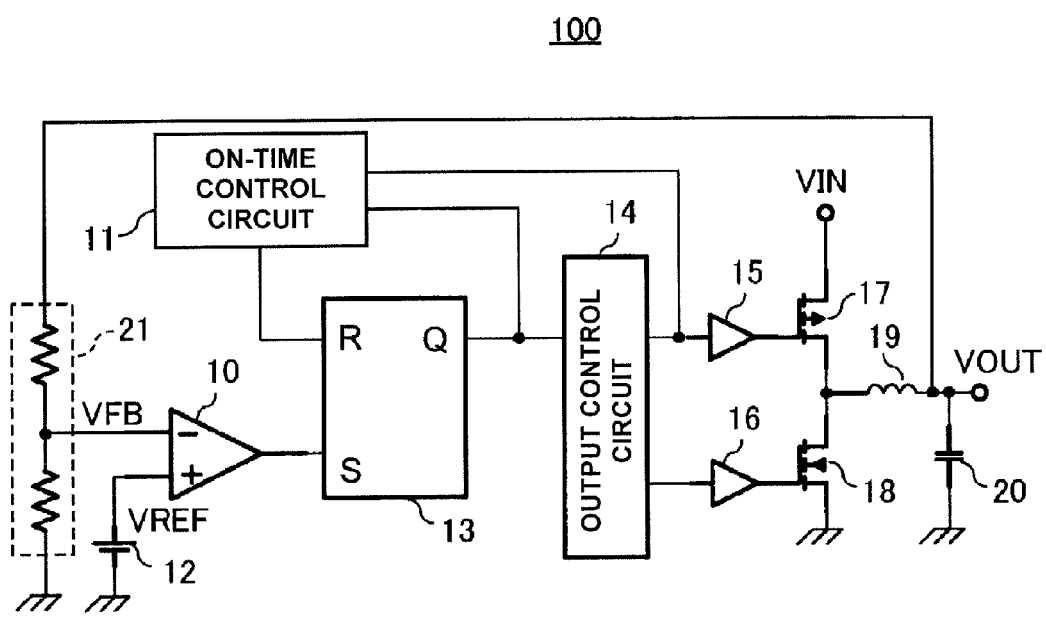
FIG. 1 is a circuit diagram illustrating one example of a COT-controlled switching regulator of the present invention.
Figure 2:
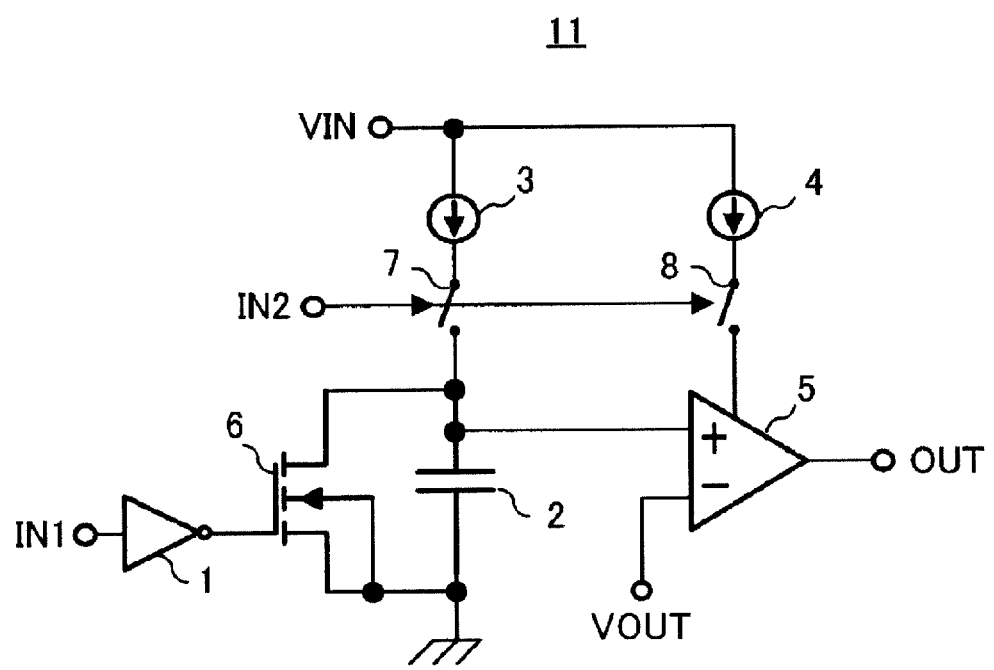
FIG. 2 is a circuit diagram illustrating one example of an on-time control circuit according to the present embodiment.
Figure 3:
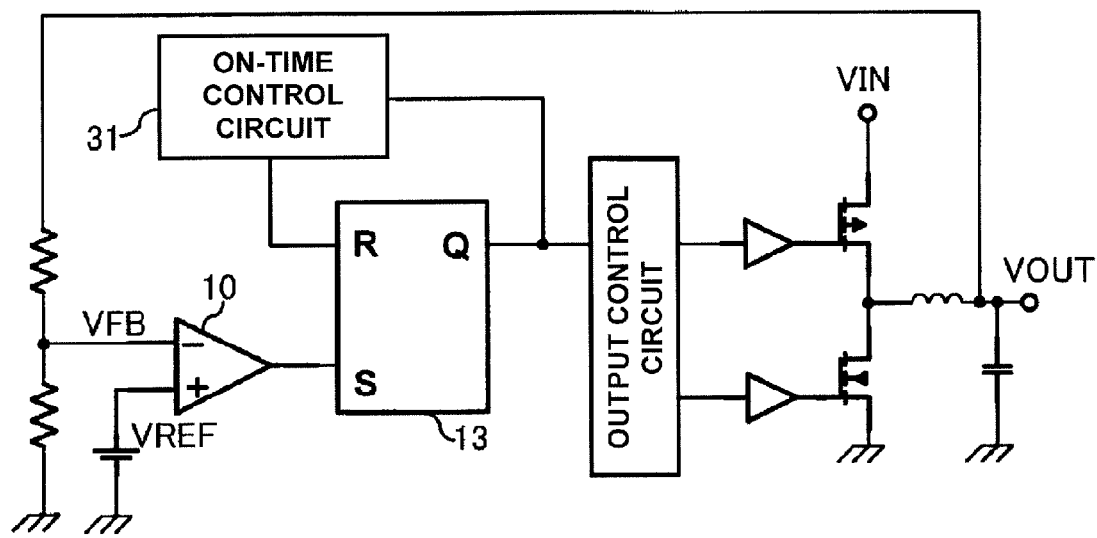
FIG. 3 is a circuit diagram of a related art COT-controlled switching regulator.
Figure 4:
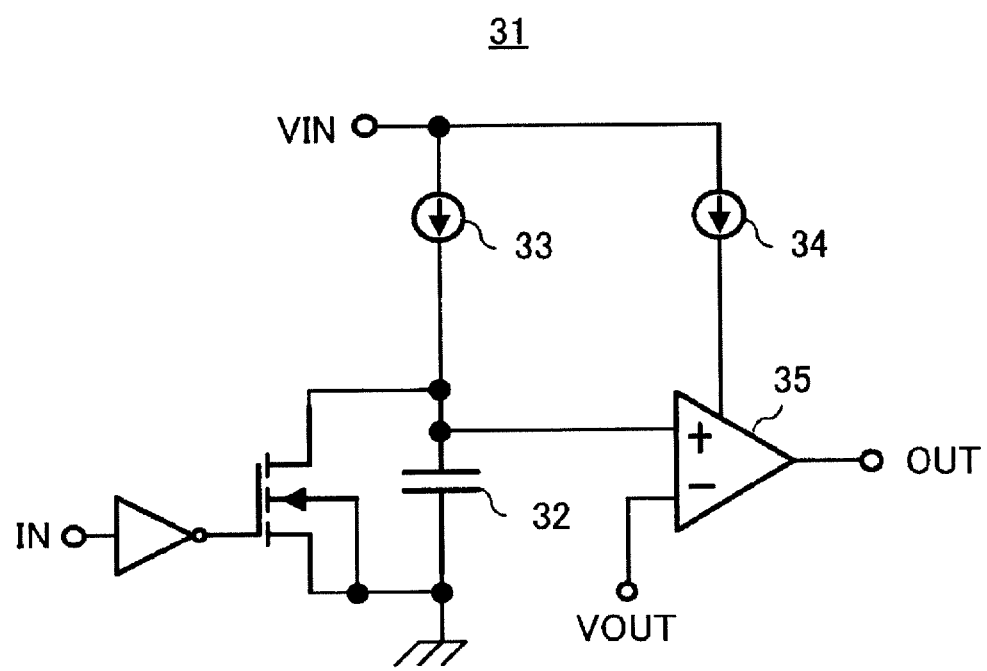
FIG. 4 is a circuit diagram illustrating a related art on-time control circuit.

A preferred embodiment of the present invention will hereinafter be described with reference to the accompanying drawings.
FIG. 1 is a circuit diagram illustrating one example of a COT-controlled switching regulator of the present invention.
The switching regulator 100 is equipped with an error comparator 10, an on-time control circuit 11, a reference voltage circuit 12, an R-S flip-flop 13, an output control circuit 14, drivers 15 and 16, a PMOS transistor 17 being a high-side switching element, an NMOS transistor 18 being a low-side switching element, an inductor 19, a capacitor 20, a voltage division circuit 21, a power supply terminal inputted with a power supply voltage VIN, and an output terminal from which an output voltage VOUT is outputted.
Since the COT-controlled switching regulator 100 is of a general configuration, the description of connection relations will be omitted.
FIG. 2 is a circuit diagram illustrating one example of the on-time control circuit 11 according to the present embodiment.
The on-time control circuit 11 is equipped with an inverter 1, a capacitor 2, current sources 3 and 4, a comparator 5, an NMOS transistor 6, switches 7 and 8, a first input terminal IN1, a second input terminal IN2, and an output terminal OUT.
The first input terminal IN1 is connected with an output terminal Q of the R-S flip-flop 13. The second input terminal IN2 is connected with a first output terminal of the output control circuit 14. The inverter 1 has an input terminal connected to the first input terminal IN1, and an output terminal connected to a gate of the NMOS transistor 6. The current source 3 has one end connected to the power supply terminal, and the other terminal connected to one end of the switch 7. The switch 7 has the other end connected to a drain of the NMOS transistor 6 and one end of the capacitor 2, and a control terminal connected to the second input terminal IN2. The gate of the NMOS transistor 6 and the other end of the capacitor 2 are connected to GND. The comparator 5 has a non-inversion input terminal connected to one end of the capacitor 2, and an inversion input terminal inputted with the output voltage VOUT. The current source 4 has one end connected to the power supply terminal, and the other terminal connected to one end of the switch 8. The switch 8 has the other end connected to a terminal supplied with an operation current of the comparator 5, and a control terminal connected to the second input terminal IN2.

The voltage division circuit 21 outputs a feedback voltage VFB, based on the output voltage VOUT. The reference voltage circuit 12 outputs a reference voltage VREF. The error comparator 10 compares the feedback voltage VFB and the reference voltage VREF. When the feedback voltage VFB becomes the reference voltage VREF or less, the error comparator 10 outputs an H signal. When the H signal is inputted to a set terminal S of the R-S flip-flop 13, the R-S flip-flop 13 outputs an H signal from an output terminal Q thereof. This H signal is inputted to the first input terminal IN1 of the on-time control circuit 11 and an input terminal of the output control circuit 14.

In response to this H signal, the output control circuit 14 outputs an L signal turning on the PMOS transistor 17 from the first output terminal thereof. The on-time control circuit 11 starts operating in response to the H signal from the output terminal Q and the L signal from the first output terminal of the output control circuit 14 and outputs an H signal to a reset terminal R of the R-S flip-flop 13 after a predetermined time. Then, the R-S flip-flop 13 outputs an L signal from the output terminal Q to the first input terminal IN1 of the on-time control circuit 11 and the input terminal of the output control circuit 14. In response to this L signal, the output control circuit 14 outputs an H signal turning off the PMOS transistor 17 from the first output terminal thereof.

Thus, the switching regulator 100 performs the switching operation to output a desired output voltage VOUT to the output terminal.

The on-time control circuit 11 is operated as follows to realize a reduction in power consumption.

When the H signal outputted from the output terminal Q of the R-S flip-flop 13 is inputted to the first input terminal IN1, the NMOS transistor 6 is turned off. When the L signal turning on the PMOS transistor 17, which is outputted from the first output terminal of the output control circuit 14, is outputted to the second input terminal IN2, the switches 7 and 8 are turned on. Since the comparator 5 is supplied with a current of the current source 4, the comparator 5 starts operating and outputs an L signal from the output terminal OUT. The capacitor 2 is charged with a current of the current source 3. When the voltage of the capacitor 2 becomes equal to or higher than the output voltage VOUT, the comparator 5 outputs an H signal from the output terminal OUT.

The output terminal OUT of the on-time control circuit 11 is connected to the reset terminal R of the R-S flip-flop 13. Thus, since the R-S flip-flop 13 is reset when the on-time control circuit 11 outputs the H signal, the output control circuit 14 outputs an H signal turning off the PMOS transistor 17 from the first output terminal. Then, since the L signal is inputted to the first input terminal IN1 and the H signal is inputted to the second input terminal IN2, the on-time control circuit 11 discharges the capacitor 2 and turns off the switches 7 and 8 to stop operating.

As described above, the on-time control circuit 11 according to the present embodiment is equipped with the switches 7 and 8 on/off-controlled by the signal inputted from the first output terminal of the output control circuit 14 to the second input terminal IN2 and is configured to be operated, i.e., intermittently operated only when the PMOS transistor 17 is on, it is possible to reduce power consumption of the switching regulator. An effect of reducing power consumption at a light load of the switching regulator is particularly large.

Incidentally, although the embodiment of the present invention has been described using the circuit diagrams of FIGS. 1 and 2, the present invention is not limited to them, but may be modified in various ways within the scope not departing from the gist of the invention. For example, the timing to turn off each of the switches 7 and 8 which stop the supply of the current may be based on a signal turning on an NMOS transistor 18.

What is claimed is:

1. A switching regulator outputting a desired output voltage to an output terminal by a switching element from a power supply voltage, comprising:
    an error comparator which monitors the output voltage to output a set signal;
    an on-time control circuit which outputs a reset signal controlling an on-time of the switching element;
    an R-S flip-flop which outputs an on signal determining a period of turning on the switching element, based on the set signal and the reset signal; and
    an output control circuit which outputs a control signal to the switching element, based on the on signal of the R-S flip-flop,
    wherein the on-time control circuit comprises a first input terminal inputted with the on signal outputted from the R-S flip-flop, and a second input terminal inputted with the control signal outputted from the output control circuit and performs an intermittent operation, based on the control signal inputted to the second input terminal.

2. The switching regulator according to claim 1, wherein the on-time control circuit comprises switches whose on/off are controlled based on the control signal inputted to the second input terminal, and current sources connected to the switches respectively, and
    wherein the switches are turned off during a period of turning off the switching element to shut off the supply of currents from the current sources to circuits.

* * * * *